(12) United States Patent
Ichikawa et al.

(10) Patent No.: US 9,225,204 B2
(45) Date of Patent: Dec. 29, 2015

(54) COIL UNIT, CONTACTLESS POWER TRANSFER APPARATUS, VEHICLE, AND CONTACTLESS POWER FEEDING SYSTEM

(75) Inventors: Shinji Ichikawa, Toyota (JP); Nobuyoshi Kikuma, Nagoya (JP)

(73) Assignees: TOYOTA JIDOSHA KABUSHIKI KAISHA, Toyota (JP); NATIONAL UNIVERSITY CORPORATION NAGOYA INSTITUTE OF TECHNOLOGY, Nagoya (JP)

( * ) Notice: Subject to any disclaimer, the term of this patent is extended or adjusted under 35 U.S.C. 154(b) by 460 days.

(21) Appl. No.: 13/885,869

(22) PCT Filed: Nov. 17, 2011

(86) PCT No.: PCT/JP2011/076524
§ 371 (c)(1),
(2), (4) Date: May 16, 2013

(87) PCT Pub. No.: WO2012/067184
PCT Pub. Date: May 24, 2012

(65) Prior Publication Data
US 2013/0234509 A1    Sep. 12, 2013

(30) Foreign Application Priority Data

Nov. 18, 2010 (JP) ................................. 2010-258008

(51) Int. Cl.
*H01F 27/42* (2006.01)
*H02J 17/00* (2006.01)
(Continued)

(52) U.S. Cl.
CPC . *H02J 17/00* (2013.01); *B60L 7/14* (2013.01);
*B60L 11/005* (2013.01); *B60L 11/14* (2013.01);
*B60L 11/182* (2013.01); *B60L 11/1833*
(2013.01); *H01F 38/14* (2013.01); *H02J 5/005*
(2013.01); *B60L 2210/10* (2013.01); *B60L 2210/30* (2013.01); *B60L 2210/40* (2013.01);
*H02J 7/025* (2013.01); *Y02T 10/70* (2013.01);
(Continued)

(58) Field of Classification Search
CPC ..... B60L 11/182; B60L 7/14; B60L 2210/10;
Y02T 90/127; Y02T 10/7005; H02J 7/025;
H02J 17/00; H02J 5/005; H01F 38/14
USPC .......................................................... 307/104
See application file for complete search history.

(56) References Cited

U.S. PATENT DOCUMENTS 7,741,734 B2    6/2010   Joannopoulos et al.
2007/0222542 A1  9/2007   Joannopoulos et al.
(Continued)

FOREIGN PATENT DOCUMENTS

AU    2006269374 B2    1/2007
AU    2006269374 C1    1/2007
(Continued)

*Primary Examiner* — Jared Fureman
*Assistant Examiner* — Duc M Pham
(74) *Attorney, Agent, or Firm* — Oliff PLC

(57) ABSTRACT

A coil unit includes a second self-resonant coil electromagnetically resonating with a spaced, first self-resonant coil to perform at least one of transmitting power to the first self-resonant coil and receiving power from the first self-resonant coil, the second self-resonant coil including a first coil and a plurality of second coils provided inside the first coil, the direction of a magnetic field formed by the first coil is the same as those formed by the second coils.

11 Claims, 12 Drawing Sheets

(51) Int. Cl.
  *B60L 11/18* (2006.01)
  *H02J 5/00* (2006.01)
  *H01F 38/14* (2006.01)
  *B60L 7/14* (2006.01)
  *B60L 11/00* (2006.01)
  *B60L 11/14* (2006.01)
  *H02J 7/02* (2006.01)

(52) U.S. Cl.
  CPC .......... *Y02T 10/7005* (2013.01); *Y02T 10/7022* (2013.01); *Y02T 10/7077* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | |
|---|---|---|
| 2008/0061785 A1 | 3/2008 | Soutome et al. |
| 2008/0278264 A1 | 11/2008 | Karalis et al. |
| 2009/0079268 A1 | 3/2009 | Cook et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141369 A1 | 6/2010 | Mori |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0225271 A1* | 9/2010 | Oyobe .................. B60L 5/005 320/108 |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0033224 A1* | 2/2013 | Raedy .................. H02J 7/025 320/107 |
| 2013/0127411 A1 | 5/2013 | Ichikawa et al. |
| 2013/0335018 A1* | 12/2013 | Ichikawa .............. B60L 11/182 320/108 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101828300 A | 9/2010 |
| CN | 101835653 A | 9/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-7-67270 | 3/1995 |
| JP | A-2003-79597 | 3/2003 |
| JP | A-2008-67807 | 3/2008 |
| JP | A-2009-501510 | 1/2009 |
| JP | A-2010-73976 | 4/2010 |
| JP | A-2012-34431 | 2/2012 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |

\* cited by examiner

ELECTROMAGNETIC FIELD INTENSITY

DISTANCE FROM ELECTROMAGNETIC SOURCE (MAGNETIC CURRENT SOURCE)

COIL UNIT, CONTACTLESS POWER TRANSFER APPARATUS, VEHICLE, AND CONTACTLESS POWER FEEDING SYSTEM

TECHNICAL FIELD

The present invention relates to a coil unit, a contactless power transfer apparatus, a vehicle, and a contactless power feeding system.

BACKGROUND ART

Conventionally, a coil unit is utilized for a magnetic resonance imaging apparatus, as also described in Japanese Patent Laying-Open Nos. 2003-79597 and 2008-67807. In recent years, as there has been a growing concern about environment, electric vehicles and hybrid vehicles are attracting attention, and a method using a coil unit to charge power through electromagnetic induction, resonance and the like is attracting attention as a method for contactlessly charging an in-vehicle battery from external power supply.

For example, Japanese Patent Laying-Open No. 7-67270 describes a contactless power feeding apparatus that includes a primary coil buried in the ground and a secondary coil mounted in a vehicle and utilizes an induced current generated in the secondary coil to charge a battery mounted in the vehicle.

Japanese Patent Laying-Open No. 2010-73976 describes a wireless power transfer apparatus that includes a power receiving device mounted in an electric vehicle and a power feeding device, and the power feeding device includes a communication coil for transmitting power and the power receiving device includes a communication coil for receiving power. The communication coil for transmitting power includes a primary coil and a resonant coil, and the communication coil for receiving power includes a primary coil and a resonant coil. The communication coil for transmitting power and the communication coil for receiving power transfer power wirelessly in a resonant power transmission method.

CITATION LIST

Patent Documents

PTD 1: Japanese Patent Laying-Open No. 2003-79597
PTD 2: Japanese Patent Laying-Open No. 2008-67807
PTD 3: Japanese Patent Laying-Open No. 07-67270
PTD 4: Japanese Patent Laying-Open No. 2010-73976

SUMMARY OF INVENTION

Technical Problem

Electromagnetically inductive, contactless power transfer allows a primary coil and a secondary coil to transfer power therebetween over only a limited, small distance, and accordingly, the primary coil and the secondary coil must be disposed adjacently. Accordingly, this power transfer system is unsuitable if it is necessary to transmit and receive power over a distance of some extent. On the other hand, Japanese Patent Laying-Open No. 2010-73976 describes a wireless power transfer apparatus that adopts a resonant power transmission method and can transmit and receive power over a larger distance than through an electromagnetic induction method.

However, the power transfer apparatus that adopts the resonant power transmission method also transmits and receives power significantly inefficiently when a power transmitting resonant coil and a power receiving resonant coil are misaligned.

The present invention has been made in view of the above issue, and it contemplates a coil unit including a resonant coil capable of at least one of transmitting power and receiving power through electromagnetic resonance, a contactless power transfer apparatus, a vehicle, and a contactless power feeding system, that can prevent decrease of power transmission efficiency or power reception efficiency even if the resonant coil is misaligned with a counterpart resonant coil.

Solution to Problem

According to the present invention a coil unit includes a second self-resonant coil electromagnetically resonating with a spaced, first self-resonant coil to perform at least one of transmitting power to the first self-resonant coil and receiving power from the first self-resonant coil. The second self-resonant coil includes a first coil and a plurality of second coils provided inside the first coil. The direction of a magnetic field formed by the first coil is the same as the direction of magnetic fields formed by the second coils. Preferably, the second coils are mutually spaced. Preferably, the first coil and the second coils are provided as a single-turn coil.

Preferably, the second coils are inscribed in an inner circumferential portion of the first coil. Preferably the second self-resonant coil is formed of a single conducting wire.

Preferably, the second self-resonant coil is formed annularly with a centerline serving as a center. The coil unit further includes an electromagnetic induction coil spaced from the second self-resonant coil along the centerline. The second self-resonant coil includes a crossover that connects the first coil and the second coil together. The crossover is bent to project toward the electromagnetic induction coil and thus cross over a portion of the second self-resonant coil. The electromagnetic induction coil includes a bent portion bent along the crossover to have a fixed distance to the second self-resonant coil.

Preferably, the second self-resonant coil is formed annularly with a centerline serving as a center. The coil unit further includes an electromagnetic induction coil spaced from the second self-resonant coil along the centerline. The second self-resonant coil includes a crossover that connects the first coil and the second coil together. The crossover is bent to project in the direction opposite to the electromagnetic induction coil and thus cross over a portion of the second self-resonant coil.

Preferably, the second self-resonant coil is formed annularly with a centerline serving as a center. When the second self-resonant coil and the electromagnetic induction coil are seen along the centerline, the electromagnetic induction coil and the first coil overlap each other. A contactless power transfer apparatus according to the present invention includes the above described coil unit. A vehicle according to the present invention includes the above described coil unit and a power storage device to store power.

A contactless power feeding system according to the present invention includes: a first coil unit including a first self-resonant coil; and a second coil unit including a second self-resonant coil electromagnetically resonating with the first self-resonant coil to perform at least one of transmitting power and receiving power.

The first self-resonant coil includes a first coil and a plurality of second coils provided inside the first coil. The second self-resonant coil includes a third coil and a plurality of fourth coils provided inside the third coil. The direction of a magnetic field formed by the first coil is the same as the direction of magnetic fields formed by the second coils, and the direction of a magnetic field formed by the third coil is the same as the direction of magnetic fields formed by the fourth coils.

Advantageous Effects of Invention

The coil unit, contactless power transfer apparatus, vehicle, and contactless power feeding system according to the present invention, keep high power transmission efficiency and high power reception efficiency even if resonant coils are misaligned.

DESCRIPTION OF EMBODIMENTS

Hereinafter, the present invention will more specifically be described in embodiment with reference to the drawings. Note that identical or corresponding components are identically denoted and will not be described repeatedly.

Figure 1:
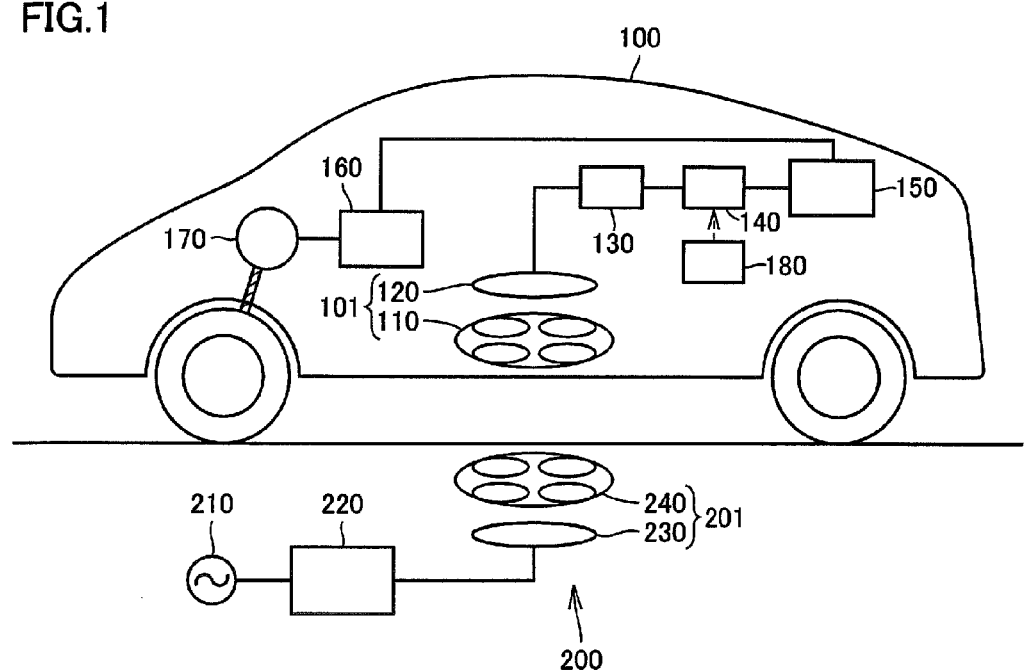
FIG. 1 is an overall view of a basic configuration of a contactless power feeding system.

FIG. 1 is an overall view of a basic configuration of a contactless power feeding system. With reference to FIG. 1, the contactless power feeding system includes a vehicle 100 that functions as a power receiving device, and a power feeding device 200.

Vehicle 100 includes a coil unit 101, a rectifier 130, a DC/DC converter 140, a power storage device 150, a power control unit (PCU) 160, a motor 170, and a vehicular electronic control unit (ECU) 180.

Note that vehicle 100 is not limited in configuration to that of FIG. 1 as long as it is a vehicle driven by a motor. For example, vehicle 100 includes a hybrid vehicle including a motor and an internal combustion engine, a fuel cell powered vehicle including a fuel cell, an electric vehicle, and the like.

Coil unit 101 includes a secondary resonant coil 110 and a secondary electromagnetic induction coil 120. Secondary resonant coil 110 is provided for example at a lower portion of the vehicular body. Secondary resonant coil 110 is an LC resonator and resonates with a primary resonant coil 240 of a coil unit 201 that is provided in power feeding device 200 via an electromagnetic field to perform at least one of receiving power from power feeding device 200 and transmitting power to power feeding device 200. Note that secondary resonant coil 110 may have a capacitive component with a capacitor provided thereto to obtain a prescribed capacitance, or secondary resonant coil 110 may dispense with a capacitor if the coil's parasitic capacitance can accommodate it.

Secondary resonant coil 110 is formed so as to increase a Q value indicating resonance strength between primary resonant coil 240 of power feeding device 200 and secondary resonant coil 110 (Q>100, for example), κ indicating a degree of coupling therebetween, and the like, based on a distance between secondary resonant coil 110 and primary resonant coil 240, a resonance frequency of primary resonant coil 240 and secondary resonant coil 110, and the like.

Secondary electromagnetic induction coil 120 is provided to be coaxial with secondary resonant coil 110 and can be magnetically coupled with secondary resonant coil 110 through electromagnetic induction. Secondary electromagnetic induction coil 120 retrieves power that is received by secondary resonant coil 110 through electromagnetic induction, and secondary electromagnetic induction coil 120 outputs the retrieved power to rectifier 130.

Rectifier 130 receives an AC power that has been retrieved by secondary electromagnetic induction coil 120, and rectifier 130 rectifies the received power and outputs DC power to DC/DC converter 140. DC/DC converter 140 receives the rectified power from rectifier 130, converts the received power to have a voltage level of power storage device 150, based on a control signal issued from vehicular ECU 180, and outputs the converted power to power storage device 150. When the vehicle is traveling, and in that condition it receives power from power feeding device 200, DC/DC converter 140 may convert the power rectified by rectifier 130 into a system voltage and supply it to PCU 160 directly. DC/DC convert 140 is not indispensable, and the AC power retrieved by secondary electromagnetic induction coil 120 and rectified by rectifier 130 may directly be provided to power storage device 150.

Power storage device 150 is a rechargeable DC power supply and configured including a lithium-ion battery or nickel metal hydride battery or similar rechargeable battery. Power storage device 150 stores therein power supplied from DC/DC converter 140 and in addition thereto regenerative power generated by motor 170. Then, power storage device 150 supplies the stored power to PCU 160. Power storage device 150 may be provided in the form of a capacitor of large capacity and may be any power buffer that can temporarily store therein the power supplied from power feeding device 200 and the regenerative power generated by motor 170 and supply the stored power to PCU 160.

PCU 160 drives motor 170 by power output from power storage device 150 or power directly supplied from DC/DC converter 140. Furthermore, PCU 160 converts the regenerative (AC) power that is generated by motor 170 into DC power, and PCU 160 outputs the DC power to power storage device 150 to charge power storage device 150 therewith. Motor 170 is driven by PCU 160 to generate driving force for causing the vehicle to travel, and output the driving force to a driving wheel. Motor 170 generates power by kinetic energy received from a driving wheel and an engine (not shown) for a hybrid vehicle, and outputs the generated regenerative power to PCU 160.

Although not shown in FIG. 1, vehicular ECU 180 includes a central processing unit (CPU), a storage device and an input/output buffer, and receives a signal from each sensor and outputs a control signal to each device and also controls vehicle 100 and each device. Note that such control may not be processed by software, and may be processed by dedicated hardware (or electronic circuitry). Note that while in FIG. 1 vehicular ECU 180 is configured to control both traveling of vehicle 100 and receiving power from power feeding device 200, the control device is not limited thereto in configuration. In other words, vehicle 100 may be configured to include a control device corresponding to each device or function individually. For example, it may be configured to include a power receiving ECU provided mainly for controlling receiving power.

Vehicular ECU 180 controls DC/DC converter 140 when vehicle 100 is fed with power from power feeding device 200. For example, vehicular ECU 180 controls DC/DC converter 140 to control voltage between rectifier 130 and DC/DC converter 140 to a prescribed target voltage. Furthermore, when the vehicle is traveling, vehicular ECU 180 controls PCU 160, based on how the vehicle currently travels, the state of charge (SOC) of power storage device 150, and the like.

Power feeding device 200 includes an AC power supply 210, a high frequency power driver 220, and coil unit 201. Coil unit 201 includes a primary electromagnetic induction coil 230 and a primary resonant coil 240.

AC power supply 210 is a power supply external to the vehicle, and it is a commercial power supply for example. High frequency power driver 220 receives power from AC power supply 210, converts the received power into high frequency power, and supplies the high frequency power to primary electromagnetic induction coil 230. High frequency power driver 220 generates high frequency power having a frequency for example of 1 MHz to several tens MHz.

Primary electromagnetic induction coil 230 is provided to be coaxial with primary resonant coil 240, and can be magnetically coupled with primary resonant coil 240 through electromagnetic induction. Primary electromagnetic induction coil 230 receives the high frequency power supplied from high frequency power driver 220 and feeds the received power to primary resonant coil 240 through electromagnetic induction.

Primary resonant coil 240 is provided for example near the ground. As well as secondary resonant coil 110, primary resonant coil 240 is also an LC resonator resonating with secondary resonant coil 110 of vehicle 100 via an electromagnetic field to transmit or receive power to or from vehicle 100. Note that primary resonant coil 240 may have a capacitive component with a capacitor provided thereto to obtain a prescribed capacitance, or primary resonant coil 240 may dispense with a capacitor if the coil's parasitic capacitance can accommodate it.

Primary resonant coil 240 is also formed so as to increase the Q value (Q>100 for example), coupling degree κ and the like, based on a distance between primary resonant coil 240 and secondary resonant coil 110 of vehicle 100, a resonance frequency of primary resonant coil 240 and secondary resonant coil 110, and the like.

Figure 2:
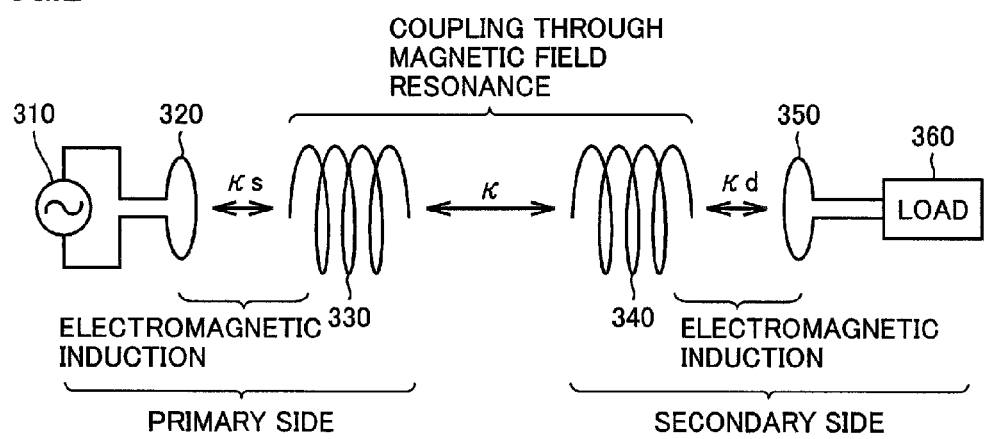
FIG. 2 is a diagram for illustrating a principle of power transfer using a resonant power transmission method.

FIG. 2 is a diagram for illustrating a principle of power transfer through resonance. With reference to FIG. 2, this methodology allows two LC resonators having equal eigenfrequencies, respectively, to resonate with each other in an electromagnetic field (a near field), as two tuning forks do, to transfer power from one coil to the other coil via the electromagnetic field.

More specifically, a primary electromagnetic induction coil 320 is connected to a high frequency power supply 310 and a primary resonant coil 330 magnetically coupled with primary electromagnetic induction coil 320 through electromagnetic induction is fed with power having a high frequency of 1 MHz to several tens MHz. Primary resonant coil 330 is an LC resonator constructed of its own inductance and parasitic capacitance (including a capacitor's capacitance if the capacitor is connected to the coil) and resonates with a secondary resonant coil 340 having the same resonance frequency as primary resonant coil 330 via an electromagnetic field (a near field). As a result, energy (or power) is transferred from primary resonant coil 330 to secondary resonant coil 340 via the electromagnetic field. Secondary resonant coil 340 receives the energy (or power), which is in turn retrieved by a secondary electromagnetic induction coil 350 magnetically coupled with secondary resonant coil 340 through electromagnetic induction and is supplied to a load 360. Note that power transfer through resonance is implemented when primary resonant coil 330 and secondary resonant coil 340 have resonance strength indicated by a Q value for example larger than 100.

Describing a correspondence between FIGS. 1 and 2, AC power supply 210 and high frequency power driver 220 illustrated in FIG. 1 correspond to high frequency power supply 310 illustrated in FIG. 2. Further, primary electromagnetic induction coil 230 and primary resonant coil 240 illustrated in FIG. 1 respectively correspond to primary electromagnetic induction coil 320 and primary resonant coil 330 illustrated in FIG. 2, and secondary resonant coil 110 and secondary electromagnetic induction coil 120 illustrated in FIG. 1 respectively correspond to secondary resonant coil 340 and secondary electromagnetic induction coil 350 illustrated in FIG. 2. Those components from rectifier 130 et seq. up to motor 170 illustrated in FIG. 1 are collectively illustrated as load 360.

Figure 3:
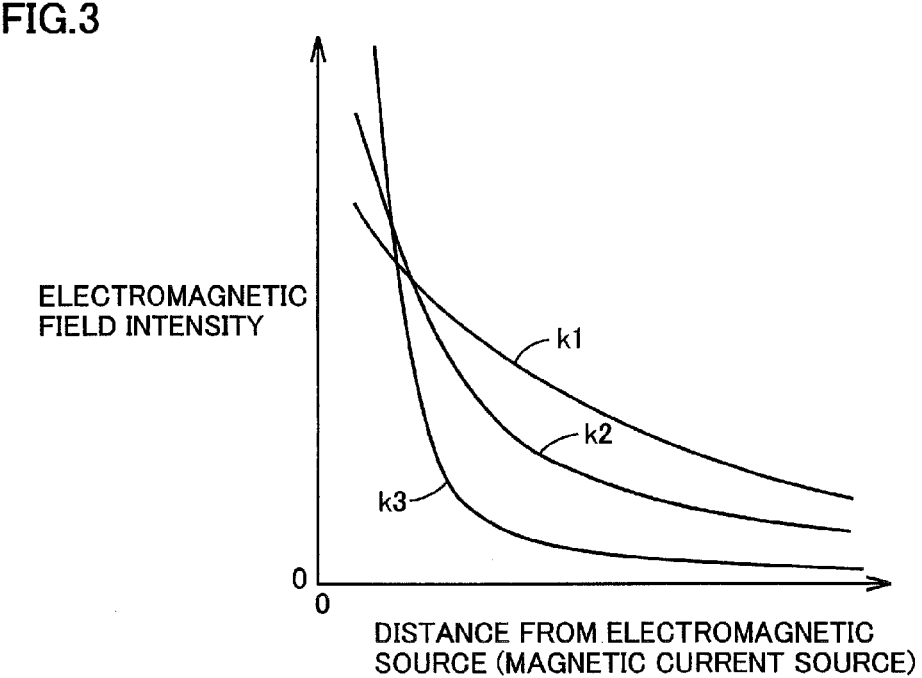
FIG. 3 is a graph for illustrating a relationship between a distance from a current source (a magnetic current source) and electromagnetic field intensity.

FIG. 3 is a graph for illustrating a relationship between a distance from a current source (a magnetic current source) and electromagnetic field intensity. Referring to FIG. 3, an electromagnetic field includes three components. A curve k1 is a component in inverse proportion to a distance from a wave source, generally referred to as "radiation electromagnetic field". A curve k2 is a component in inverse proportion to the square of the distance from the wave source, generally referred to as "induction electromagnetic field". A curve k3 is a component in inverse proportion to the cube of the distance from the wave source, generally referred to as "static electromagnetic field".

A static electromagnetic field is a region in which an electromagnetic field steeply decreases in intensity as a function of the distance from the wave source and the resonance methodology utilizes a near field dominated by the static electromagnetic field, or an evanescent field, to transfer energy (or power). More specifically, a pair of resonators having equal eigenfrequencies, respectively, (a pair of LC resonators for example) is resonated in the near field dominated by the static electromagnetic field to transfer energy (or power) from one of the resonators (a primary resonant coil) to the other resonator (a secondary resonant coil). The static electromagnetic field does not propagate energy over a long distance, and the resonance methodology can transfer power with less energy loss than an electromagnetic field transferring energy (or power) by a radiation electromagnetic field transferring energy over a long distance.

Figure 4:
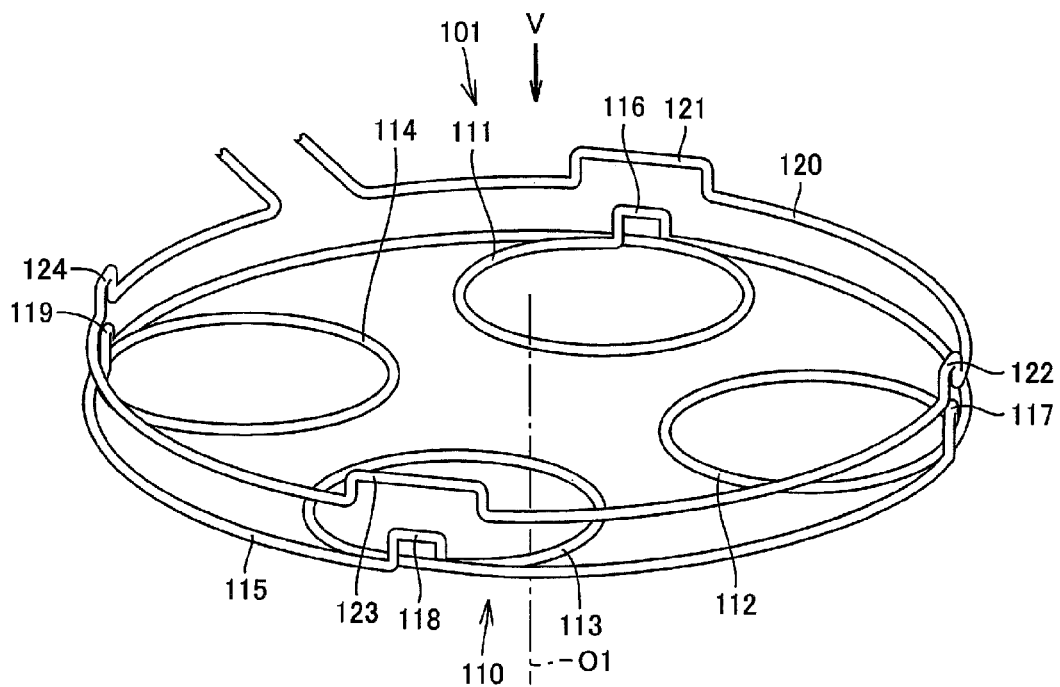
FIG. 4 is a perspective view schematically showing a coil unit 101 mounted in a vehicle.

FIG. 4 is a perspective view schematically showing coil unit 101 mounted in the vehicle. As shown in FIG. 4, coil unit 101 includes secondary resonant coil 110 and secondary electromagnetic induction coil 120.

Figure 5:
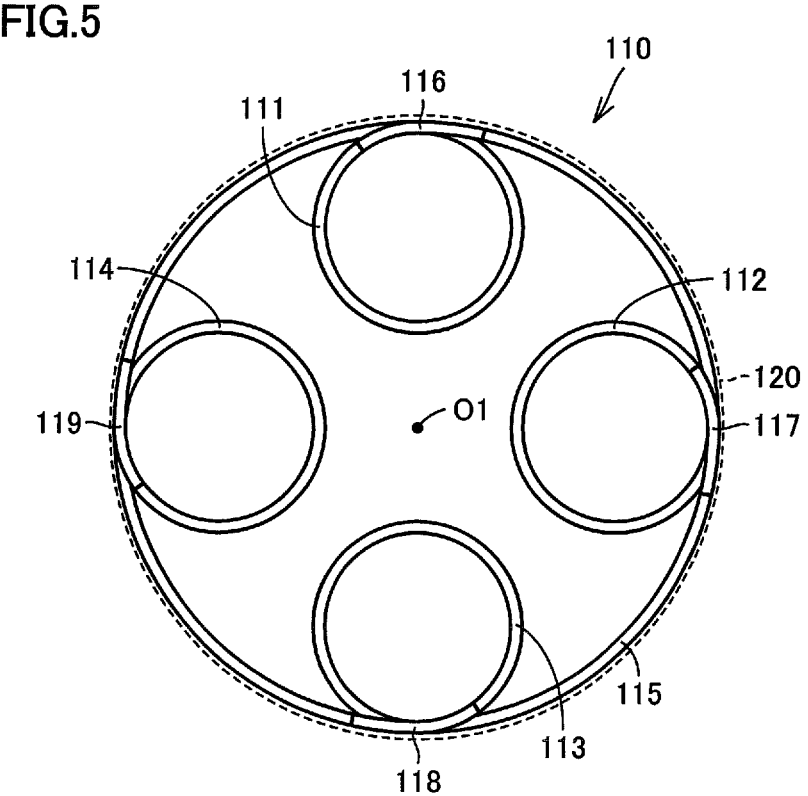
FIG. 5 is a plan view of a secondary resonant coil 110 and a secondary electromagnetic induction coil 120 as seen in a direction V shown in FIG. 4.

FIG. 5 is a plan view of secondary resonant coil 110 and secondary electromagnetic induction coil 120 as seen in a direction V shown in FIG. 4. Note that in FIG. 5 secondary electromagnetic induction coil 120 is indicated by a dashed line. As shown in FIG. 5 and FIG. 4, secondary resonant coil 110 is disposed under secondary electromagnetic induction coil 120. Secondary resonant coil 110 includes a larger-diameter coil 115 formed to extend with a centerline O1 serving as a center, a plurality of smaller-diameter coils 111, 112, 113, 114 provided in larger-diameter coil 115, and a plurality of crossovers 116, 117, 118, 119.

Larger-diameter coil 115 and secondary electromagnetic induction coil 120 overlap each other when they are seen in a direction as seen from a position on centerline O1 toward the center point of larger-diameter coil 115.

In other words, larger-diameter coil 115 and secondary electromagnetic induction coil 120 are formed each along the other.

Note that secondary resonant coil 110 and secondary electromagnetic induction coil 120 pass a current therebetween through electromagnetic induction.

When larger-diameter coil 115 and secondary electromagnetic induction coil 120 that are positioned to overlap each other pass a current therebetween a current passing through secondary resonant coil 110 causes magnetic lines of force, most of which will pass through secondary electromagnetic induction coil 120 and thus cause large electromotive force in secondary electromagnetic induction coil 120. Thus secondary resonant coil 110 and secondary electromagnetic induction coil 120 can pass a current therebetween satisfactorily.

Smaller-diameter coils 111, 112, 113, 114 are provided along a circumference of larger-diameter coil 115 and mutually spaced. Smaller-diameter coils 111, 112, 113, 114 are disposed annularly with centerline O1 serving as a center, and smaller-diameter coils 111, 112, 113, 114 are inscribed in an inner circumferential portion of larger-diameter coil 115. This ensures that smaller-diameter coils 111, 112, 113, 114 can each have a large diameter allowing power reception and transmission to be done more efficiently.

Secondary resonant coil 110 is formed of a single conducting wire, and larger-diameter coil 115, smaller-diameter coils 111, 112, 113, 114 and crossovers 116, 117, 118, 119 are formed of a single conducting wire in one piece.

Secondary resonant coil 110 formed of a single conducting wire allows secondary electromagnetic induction coil 120 transmitting/receiving power to/from secondary resonant coil 110 to be provided as a single coil, which can contribute to a reduced number of components. Note that larger-diameter coil 115 and smaller-diameter coils 111, 112, 113, 114 are provided in the form of a single-turn coil, and secondary resonant coil 110 is thus compact.

Figure 6:
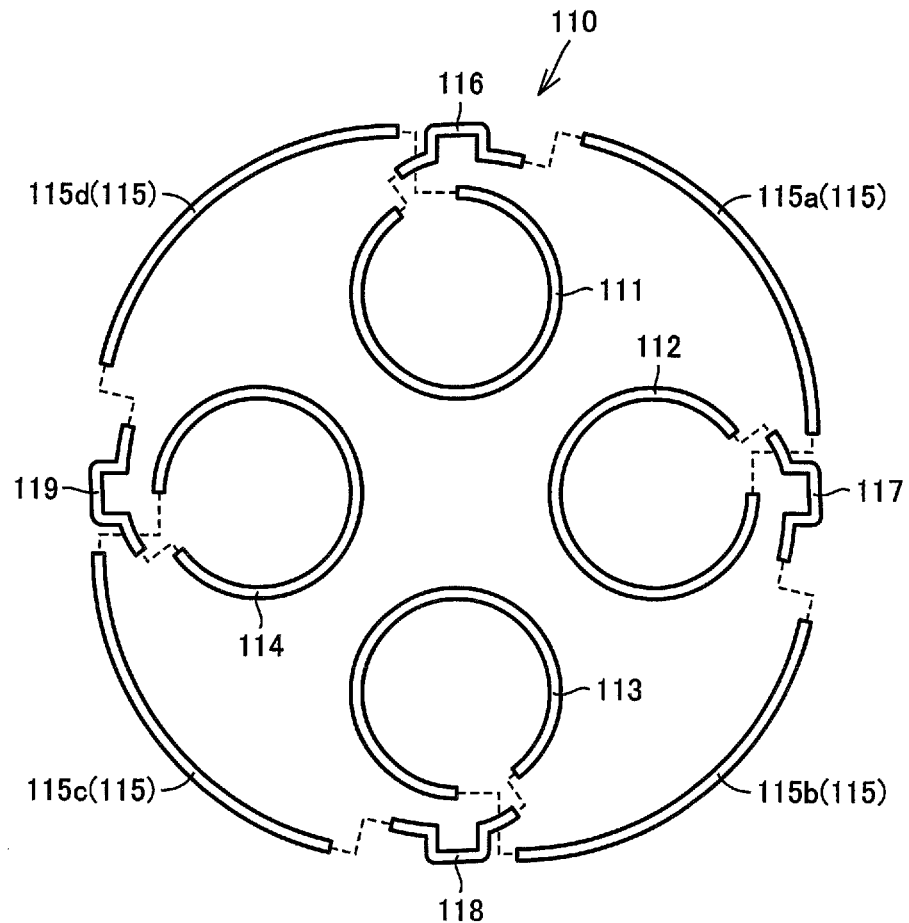
FIG. 6 is an exploded view for specifically illustrating secondary resonant coil 110, when secondary resonant coil 110 is cut for each constituent of secondary resonant coil 110.

FIG. 6 is an exploded view for specifically illustrating secondary resonant coil 110, as exploded when secondary resonant coil 110 is cut for each constituent of secondary resonant coil 110.

As shown in FIG. 6, larger-diameter coil 115 includes a plurality of arcuate portions 115a-115d. Each arcuate portion 115a-115d is formed to extend arcuately with centerline O1 shown in FIGS. 4 and 5 serving as a center.

Note that larger-diameter coil 115 is not limited to be circular in geometry, and it may be square, polygonal, elliptical and other various forms.

Smaller-diameter coils 111, 112, 113, 114 are also generally circular; however, they are not so limited and may be square, polygonal, elliptical and other various forms. Note that smaller-diameter coils 111, 112, 113, 114 each have a centerline away from centerline O1 and aligned with centerline O1 serving as a center.

Crossovers 116, 117, 118, 119 connect smaller-diameter coils 111, 112, 113, 114 and arcuate portions 115a, 115b, 115c, 115d.

Crossover 116 connects one end of arcuate portion 115a and one end of smaller-diameter coil 111, and the other end of arcuate portion 115a is connected to one end of smaller-diameter coil 112.

Crossover 117 connects the other end of smaller-diameter coil 112 and one end of arcuate portion 115b, and the other end of arcuate portion 115b is connected to one end of smaller-diameter coil 113. Crossover 118 connects the other end of smaller-diameter coil 113 and one end of arcuate portion 115c, and the other end of arcuate portion 115c is connected to one end of smaller-diameter coil 114. Crossover 119 connects the other end of smaller-diameter coil 114 and one end of arcuate portion 115d. The other end of arcuate portion 115d is connected to the other end of smaller-diameter coil 111.

Note that although FIG. 6 shows secondary resonant coil 110 exploded for a convenient purpose for the sake of illustration, secondary resonant coil 110 is formed of a single conducting wire.

Figure 7:
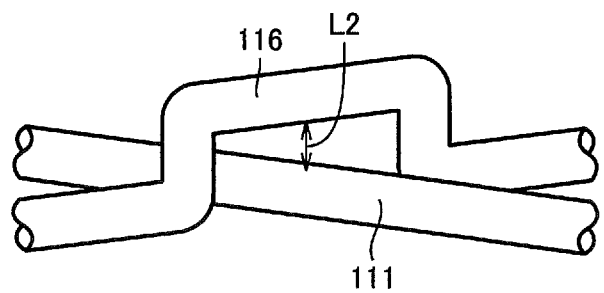
FIG. 7 is a perspective view of a crossover 116 and a vicinity thereof in configuration.

FIG. 7 is a perspective view of crossover 116 and a vicinity thereof in configuration. As shown in FIG. 4 and FIG. 7, crossover 116 is formed to cross over a portion of secondary resonant coil 110, or smaller-diameter coil 111.

Crossover 116 is bent to project toward secondary electromagnetic induction coil 120. Note that other crossovers 117, 118, 119 are also formed to be similar to secondary electromagnetic induction coil 120, and they are each formed to cross over a portion of secondary resonant coil 110.

Crossover 116, 117, 118, 119 and a portion of secondary resonant coil 110 are spaced by a distance L2 set for example to be larger than the diameter of the conducting wire that configures secondary resonant coil 110 to minimize/prevent electric discharge caused between crossovers 116, 117, 118, 119 and secondary resonant coil 110.

Figure 8:
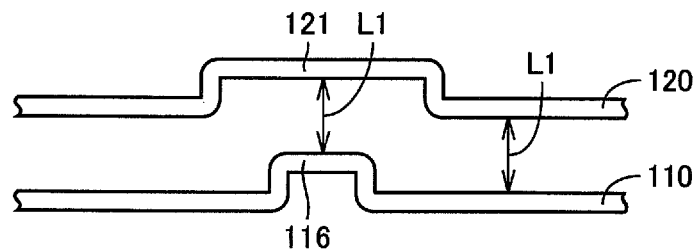
FIG. 8 is a side view partially showing secondary resonant coil 110 and secondary electromagnetic induction coil 120.

FIG. 8 is a side view partially showing secondary resonant coil 110 and secondary electromagnetic induction coil 120. As shown in FIG. 8, secondary electromagnetic induction coil 120 includes a bent portion 121 extending along crossover 116.

Crossover 116 is bent so that a distance L1 between bent portion 121 and crossover 116 is equal to a distance between a portion of secondary electromagnetic induction coil 120 other than bent portion 121 and secondary resonant coil 110.

As shown in FIG. 4, secondary electromagnetic induction coil 120 includes bent portions 122, 123, 124 extending along crossovers 117, 118, 119 of secondary resonant coil 110.

Thus, secondary electromagnetic induction coil 120 and secondary resonant coil 110 are formed to have distance L1 therebetween that is fixed along their respective, entire circumferences.

If secondary resonant coil 110 and secondary electromagnetic induction coil 120 that do not have a portion with a reduced distance therebetween have a current of high voltage passing therethrough, electric discharge can be prevented between secondary resonant coil 110 and secondary electromagnetic induction coil 120.

Furthermore, secondary electromagnetic induction coil 120 and secondary resonant coil 110 spaced by a fixed distance allow satisfactory electromotive force to be generated in secondary electromagnetic induction coil 120, and allow secondary resonant coil 110 and secondary electromagnetic induction coil 120 to pass power therebetween satisfactorily.

Figure 9:
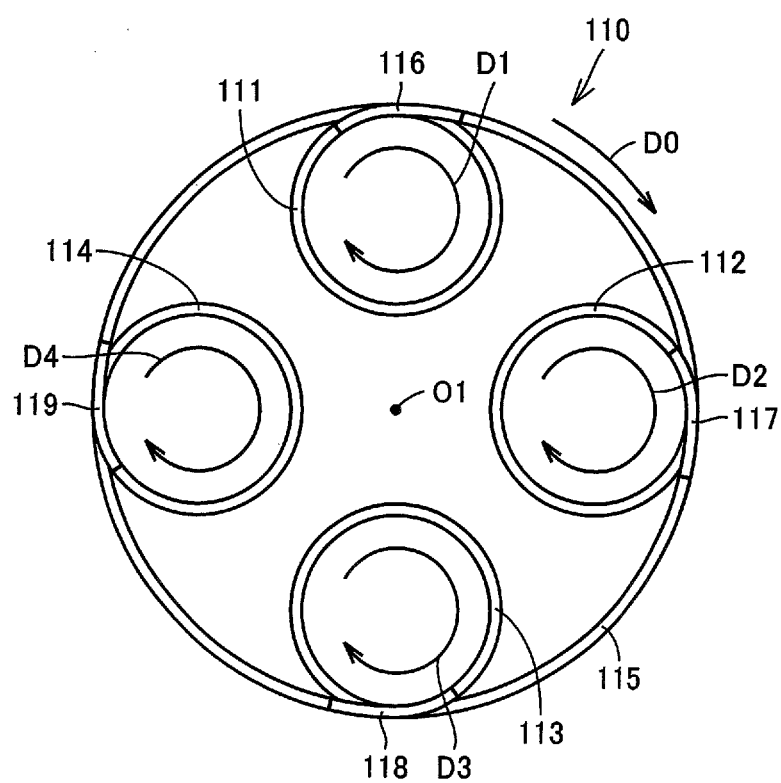
FIG. 9 schematically shows secondary resonant coil 110 with a current passing therethrough.

FIG. 9 schematically shows secondary resonant coil 110 with a current passing therethrough. As shown in FIG. 9, when a current passing through secondary resonant coil 110, larger-diameter coil 115 passes a current in a direction D0. Smaller-diameter coils 111, 112, 113, 114 pass a current in directions D1, D2, D3, D4.

When larger-diameter coil 115 and smaller-diameter coils 111, 112, 113, 114 pass a current in the above indicated directions, larger-diameter coil 115 and smaller-diameter coils 111, 112, 113, 114 generate magnetic fields. Note that larger-diameter coil 115 and smaller-diameter coils 111, 112, 113, 114 are wound so as to generate the magnetic fields all in the same direction.

Then, by passing a current of a prescribed resonant frequency through secondary resonant coil 110, a near field is formed around secondary resonant coil 110.

Figure 10:
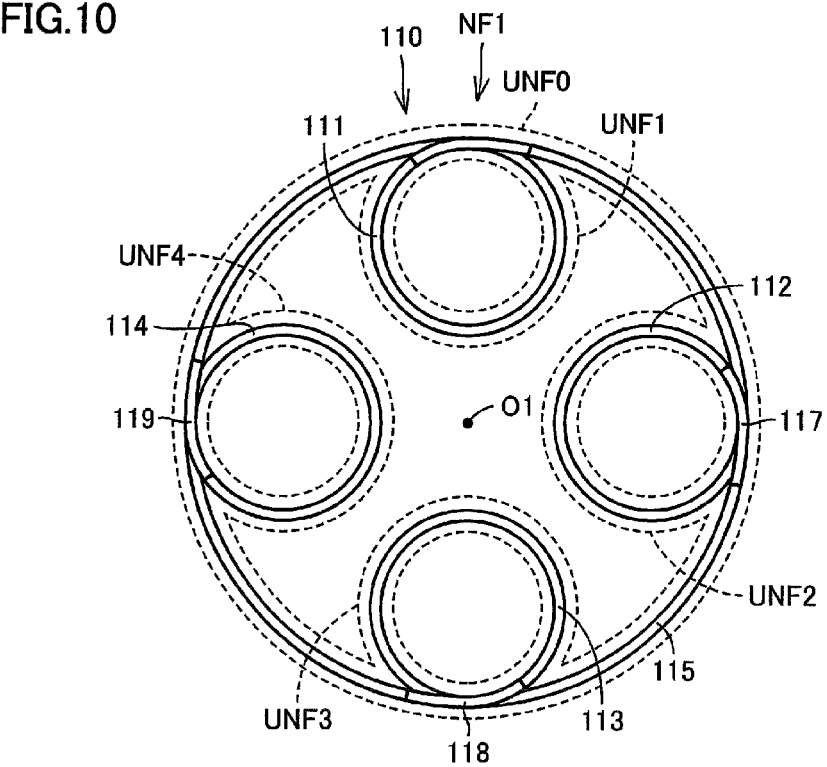
FIG. 10 schematically shows secondary resonant coil 110 with a current of a resonant frequency passing therethrough.

FIG. 10 schematically shows secondary resonant coil 110 with a current of a resonant frequency passing therethrough. By passing a current of a resonant frequency through secondary resonant coil 110, a near field NF1 is formed around secondary resonant coil 110.

FIG. 10 schematically shows a region of the near field formed around secondary resonant coil 110, that has large intensity.

Around larger-diameter coil 115 is formed a unit near field UNF0, and around smaller-diameter coils 111, 112, 113, 114 are formed unit near fields UNF1, UNF2, UNF3, UNF4. Smaller-diameter coils 111, 112, 113, 114 are mutually spaced. If smaller-diameter coils 111, 112, 113, 114 should have an overlapping portion, a near field would not be generated satisfactorily at the overlapping portion, resulting in decreasing of power receiving efficiency and power transmitting efficiency between primary electromagnetic induction coil 230 and secondary resonant coil 110.

Accordingly, in the present embodiment, smaller-diameter coils 111, 112, 113, 114 are mutually spaced for efficient power reception.

Figure 11:
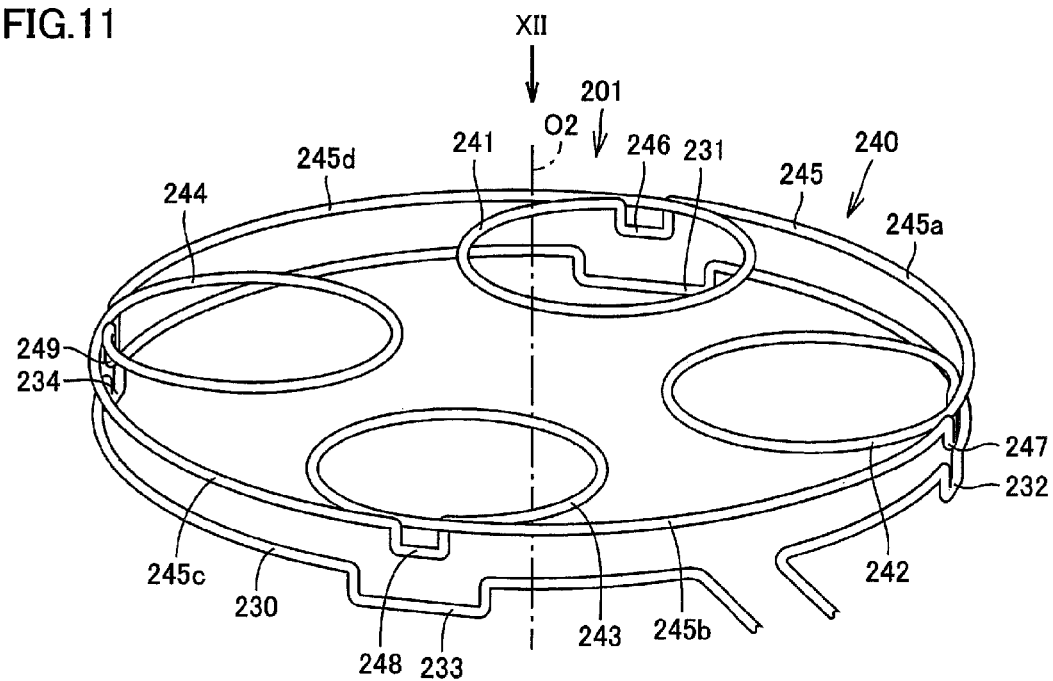
FIG. 11 is a schematic perspective view of a coil unit 201.
Figure 12:
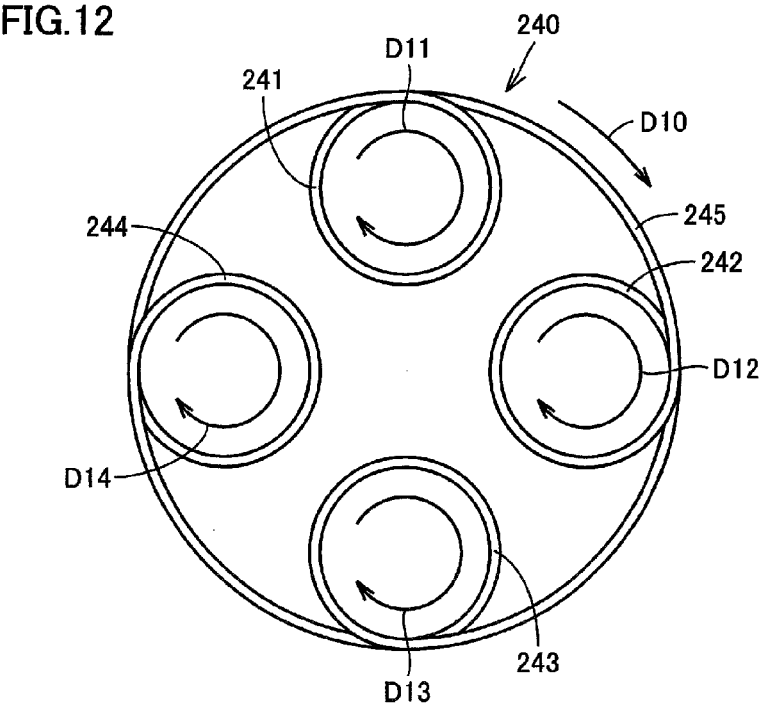
FIG. 12 is a plan view of a primary electromagnetic induction coil 230 and a primary resonant coil 240 as seen in a direction XII shown in FIG. 11.

FIG. 11 is a schematic perspective view of coil unit 201 and FIG. 12 is a plan view of primary electromagnetic induction coil 230 and primary resonant coil 240 as seen in a direction XII shown in FIG. 11.

As shown in FIG. 11 and FIG. 12, coil unit 201 includes primary resonant coil 240 and primary electromagnetic induction coil 230 disposed under primary resonant coil 240.

Primary resonant coil 240 is substantially identical in geometry to secondary resonant coil 110. Primary resonant coil 240 includes a larger-diameter coil 245, a plurality of smaller-diameter coils 241, 242, 243, 244 provided inside larger-diameter coil 245, and crossovers 246, 247, 248, 249 connecting larger-diameter coil 245 and each smaller-diameter coil 241, 242, 243, 244.

Note that, as well as secondary resonant coil 110, primary resonant coil 240 is also formed of a single conducting wire. This allows primary electromagnetic induction coil 230 or the like transmitting/receiving power to/from primary resonant coil 240 to be provided as a single coil, which can contribute to simplifying the apparatus.

Primary electromagnetic induction coil 230 is formed to overlap larger-diameter coil 245 when in FIG. 11 primary resonant coil 240 and primary electromagnetic induction coil 230 are seen in a direction as seen from a point on a centerline O2 toward the center point of primary resonant coil 240. Thus primary resonant coil 240 and primary electromagnetic induction coil 230 can pass power therebetween satisfactorily.

In FIG. 11, larger-diameter coil 245 includes arcuate portions 245a, 245b, 245c, 245d extending with centerline O2 serving as a center, and crossovers 246, 247, 248, 249 connect arcuate portions 245a, 245b, 245c, 245d and smaller-diameter coils 241, 242, 243, 244.

The FIG. 11 example also provides crossover 246, 247, 248, 249 formed to cross over a portion of primary resonant coil 240 and bent to project toward primary electromagnetic induction coil 230.

Primary electromagnetic induction coil 230 includes bent portions 231, 232, 233, 234 bent to match crossovers 246, 247, 248, 249 in geometry to reduce/prevent electric discharge caused between primary electromagnetic induction coil 230 and primary resonant coil 240.

Furthermore, primary electromagnetic induction coil 230 and primary resonant coil 240 spaced by a fixed distance allow satisfactory electromotive force to be generated in primary electromagnetic induction coil 230 and primary electromagnetic induction coil 230 and primary resonant coil 240 to pass power therebetween more efficiently.

In FIG. 12, when larger-diameter coil 245 passes a current in a direction D10, smaller-diameter coils 241, 242, 243, 244 pass a current in directions D11, D12, D13, and D14. Accordingly, larger-diameter coil 245 and each smaller-diameter coil 241, 242, 243, 244 form magnetic fields, respectively, in the same direction.

Figure 13:
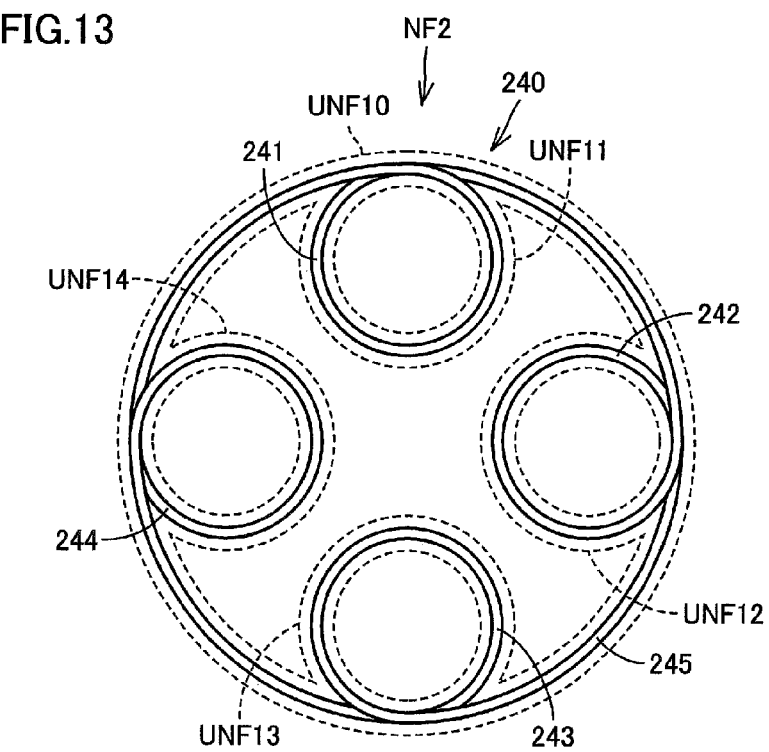
FIG. 13 is a diagram schematically showing a region of a near field formed around primary resonant coil 240, that has large intensity.

Then, by passing a current of a resonant frequency through primary resonant coil 240, a near field NF2 is formed around primary resonant coil 240, as shown in FIG. 13. Note that FIG. 13 is a diagram schematically showing a region of a near field formed around primary resonant coil 240, that has large intensity.

As shown in FIG. 13, near field NF2 includes a unit near field UNF10 formed around larger-diameter coil 245, and unit near fields UNF11, UNF12, UNF13, UNF14 formed around smaller-diameter coils 241, 242, 243, 244.

Figure 14:
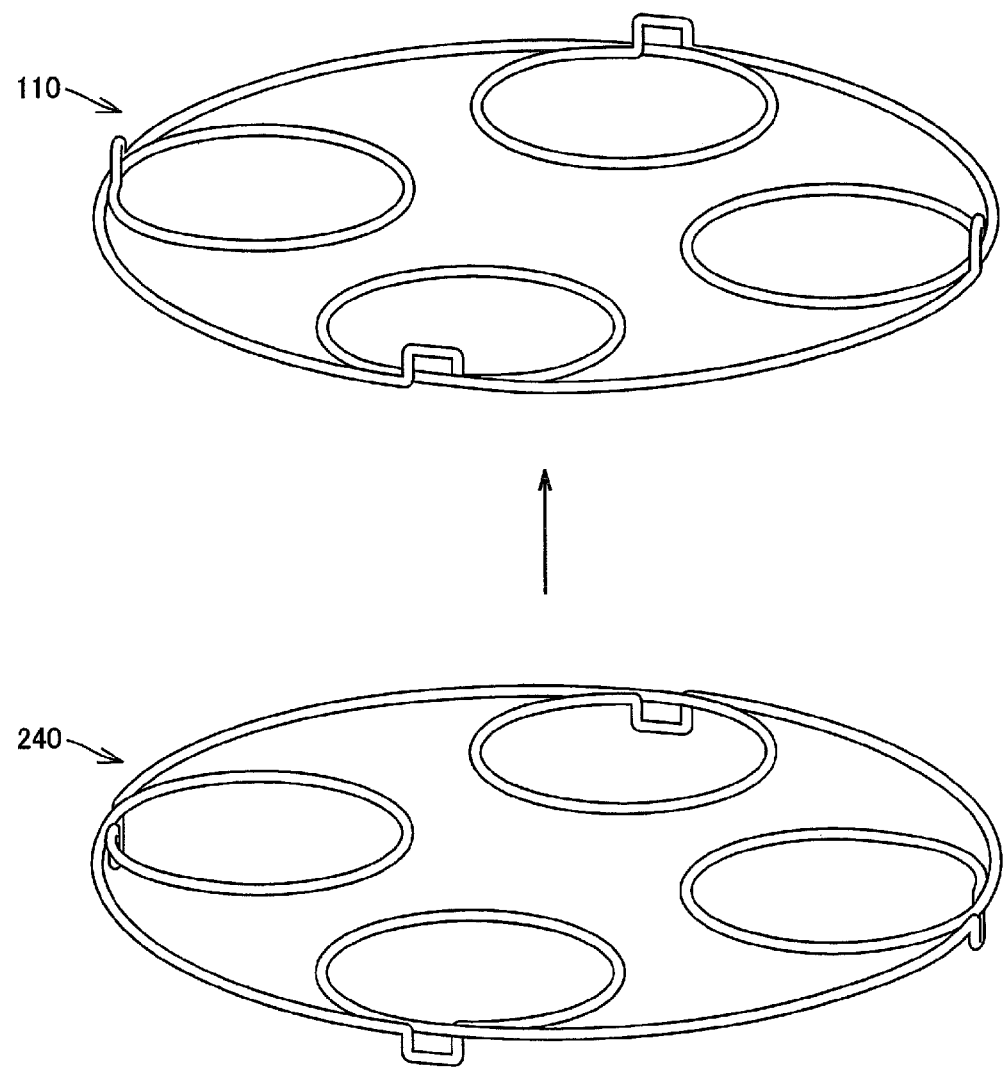
FIG. 14 is a schematic diagram showing a relative, positional relationship between secondary resonant coil 110 and primary resonant coil 240 in charging a power storage device 150 mounted in a vehicle 100.

When power storage device 150 mounted in vehicle 100 is charged, secondary resonant coil 110 is positioned over primary resonant coil 240, as shown in FIG. 14.

Then, a high frequency current of a resonant frequency passes through primary resonant coil 240. Then, as shown in FIG. 13, near field NF2 is formed around primary resonant coil 240.

Figure 15:
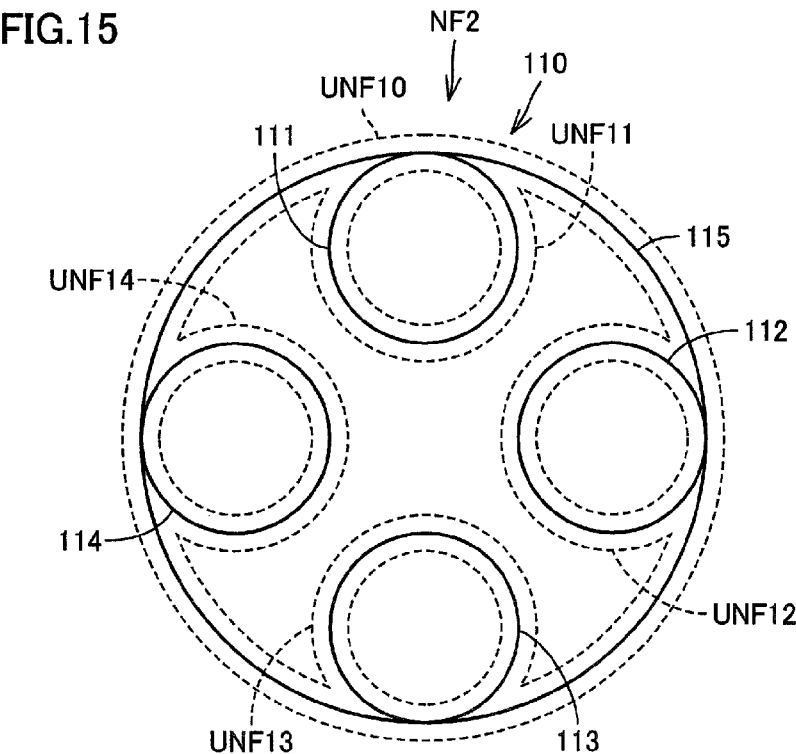
FIG. 15 is a plan view showing a positional relationship between secondary resonant coil 110 and a near field NF2 in the state where secondary resonant coil 110 and primary resonant coil 240 are vertically aligned.

FIG. 15 is a plan view showing a positional relationship between secondary resonant coil 110 and near field NF2 with secondary resonant coil 110 and primary resonant coil 240 vertically aligned.

In the FIG. 15 state, secondary resonant coil 110 is located in near field NF2, and satisfactory power is transmitted from primary resonant coil 240 to secondary resonant coil 110.

Figure 16:
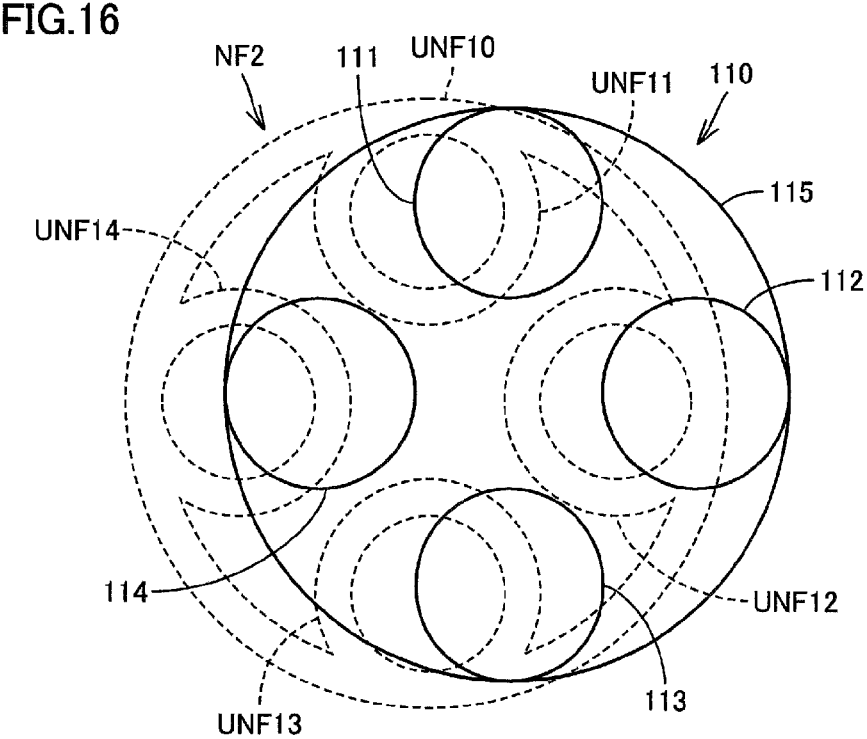
FIG. 16 is a plan view showing secondary resonant coil 110 positionally offset from a position thereof shown in FIG. 15.

FIG. 16 is a plan view showing secondary resonant coil 110 positionally offset from a position thereof shown in FIG. 15.

In FIG. 16, with reference to FIG. 15, secondary resonant coil 110 is positionally offset from its optimum position. On the other hand, as seen in a plane, secondary resonant coil 110 intersects near field NF2 at a large number of locations because of including a plurality of smaller-diameter coils 111, 112, 113, 114. Accordingly, as shown in FIG. 16, even if secondary resonant coil 110 is positionally offset, secondary resonant coil 110 can receive power from primary resonant coil 240, and decreasing power transmitting efficiency is prevented.

Furthermore, a plurality of smaller-diameter coils 111, 112, 113, 114 are disposed inside larger-diameter coil 115, which prevents secondary resonant coil 110 per se from being increased in size.

Figure 17:
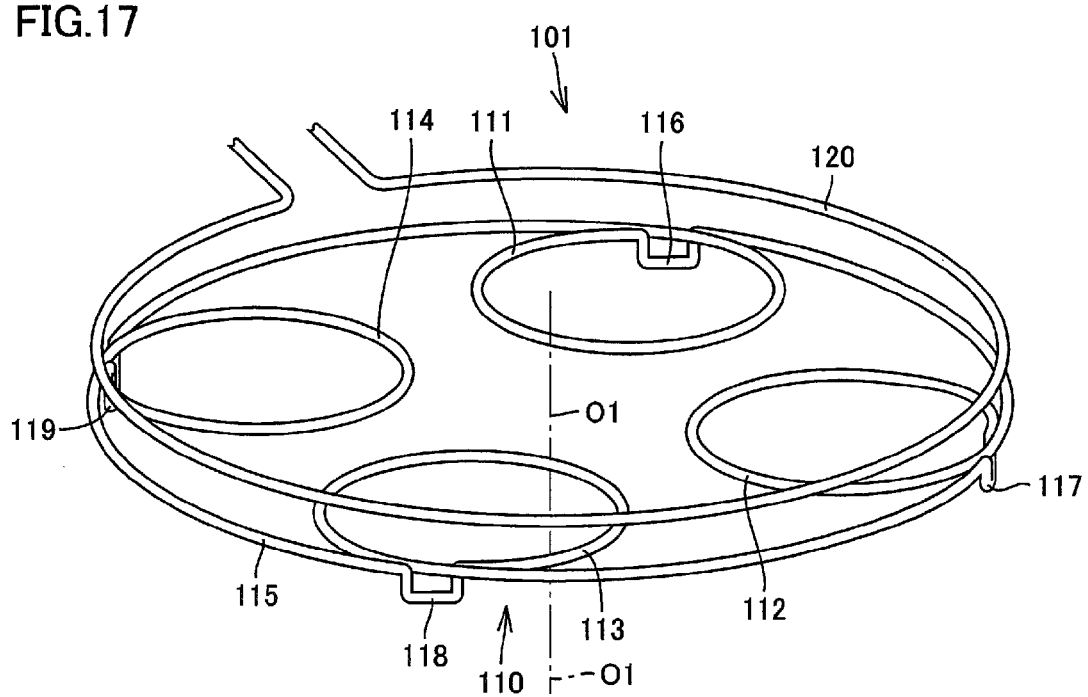
FIG. 17 is a perspective view showing a first exemplary variation of coil unit 101.
Figure 18:
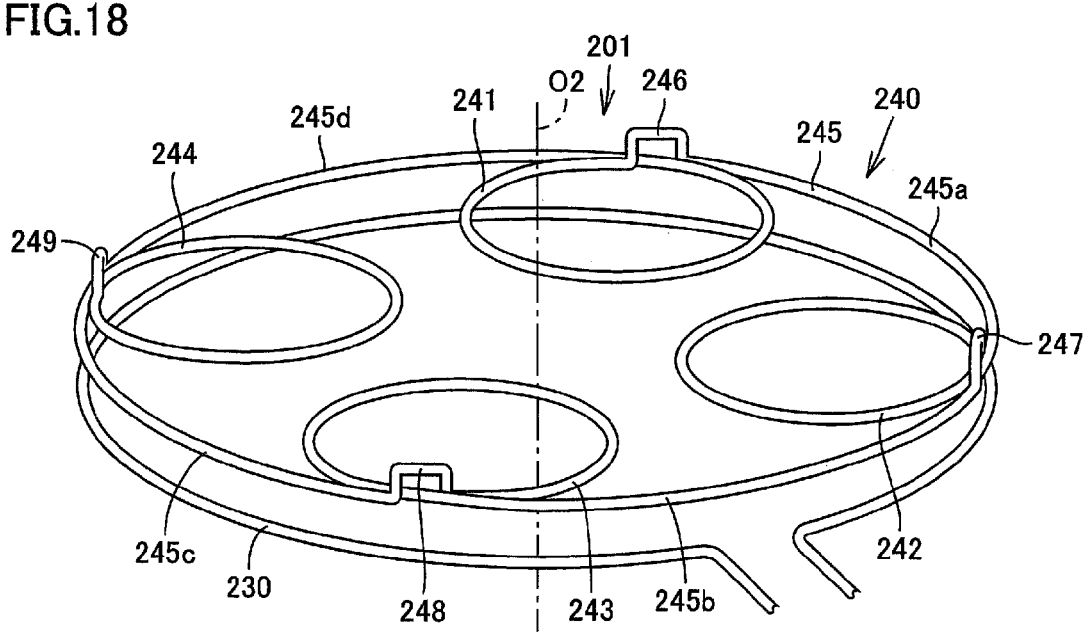
FIG. 18 is a perspective view showing a first exemplary variation of coil unit 201.

FIG. 17 is a perspective view showing a first exemplary variation of coil unit 101 and FIG. 18 is a perspective view showing a first exemplary variation of coil unit 201. The FIG. 17 example provides crossovers 116, 117, 118, 119 bent to project to face away from secondary electromagnetic induction coil 120 with secondary resonant coil 110 therebetween and thus each cross over a portion of secondary resonant coil 110. On the other hand, secondary electromagnetic induction coil 120 does not have bent portions 121, 122, 123, 124 as shown in FIG. 4 or the like, and is thus simple in geometry.

Similarly the FIG. 18 example also provides crossovers 246, 247, 248, 249 bent to project to face away from primary electromagnetic induction coil 230 with primary resonant coil 240 therebetween and thus each cross over a portion of primary resonant coil 240. Primary electromagnetic induction coil 230 does not have bent portions 231, 232, 233, 234 as shown in FIG. 11, and is thus simple in geometry.

Figure 19:
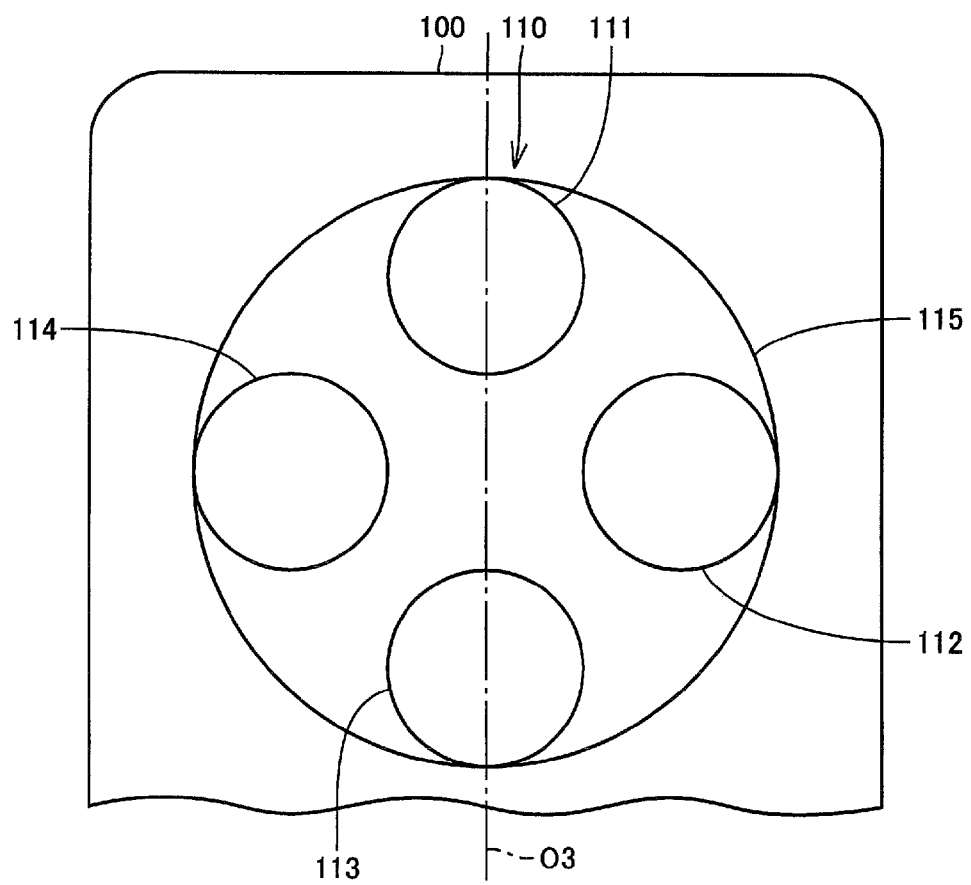
FIG. 19 is a plan view schematically showing secondary resonant coil 110 and vehicle 100.
Figure 20:
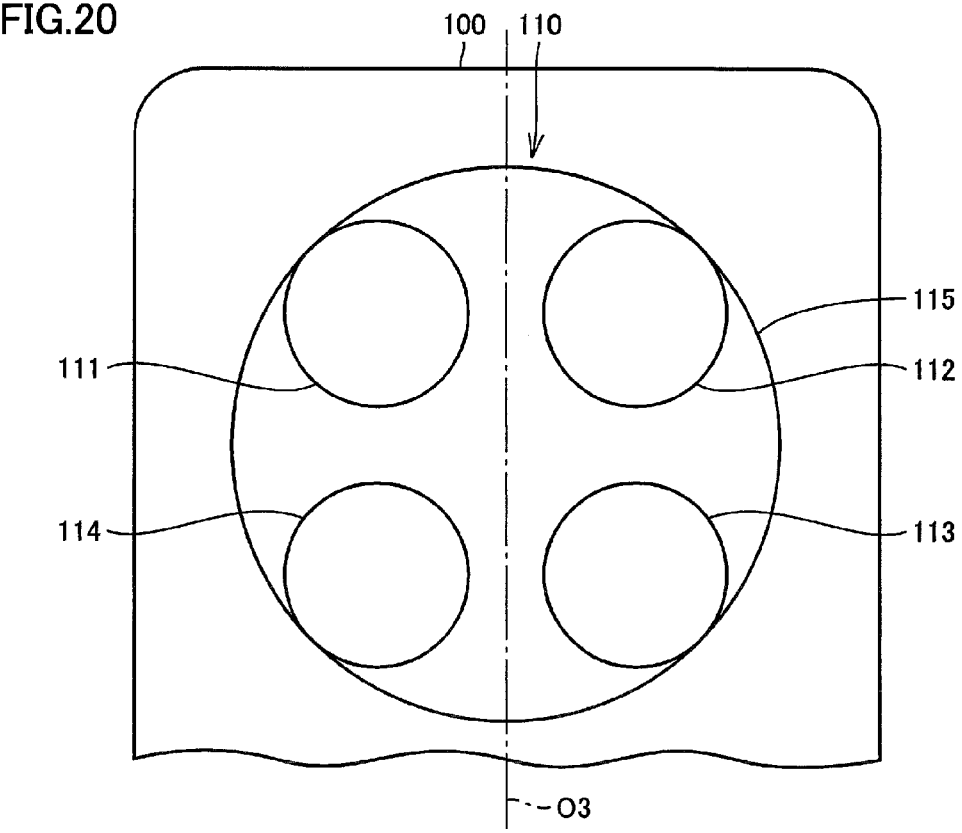
FIG. 20 is a plan view schematically showing secondary resonant coil 110 and vehicle 100.

FIG. 19 is a plan view schematically showing secondary resonant coil 110 and vehicle 100. In the FIG. 19 example, smaller-diameter coil 111 and smaller-diameter coil 113 are disposed in a fore-aft direction of the vehicle, and smaller-diameter coil 112 and smaller-diameter coil 114 are disposed in a widthwise direction of vehicle 100. In the FIG. 20 example, a centerline O3 represents a centerline passing through a center portion of vehicle 100 across its width and extending in a fore-aft direction of vehicle 100. Smaller-diameter coil 111 and smaller-diameter coil 112 are disposed in a widthwise direction of vehicle 100 to sandwich centerline O3. Smaller-diameter coil 113 and smaller-diameter coil 114 are also disposed in a widthwise direction of vehicle 100 to sandwich centerline O3. Note that smaller-diameter coil 112 and smaller-diameter coil 113 are disposed in a fore-aft direction of vehicle 100, and smaller-diameter coil 111 and smaller-diameter coil 114 are also disposed in a fore-aft direction of vehicle 100. Thus, secondary resonant coil 110 can be mounted in various arrangements.

Figure 21:
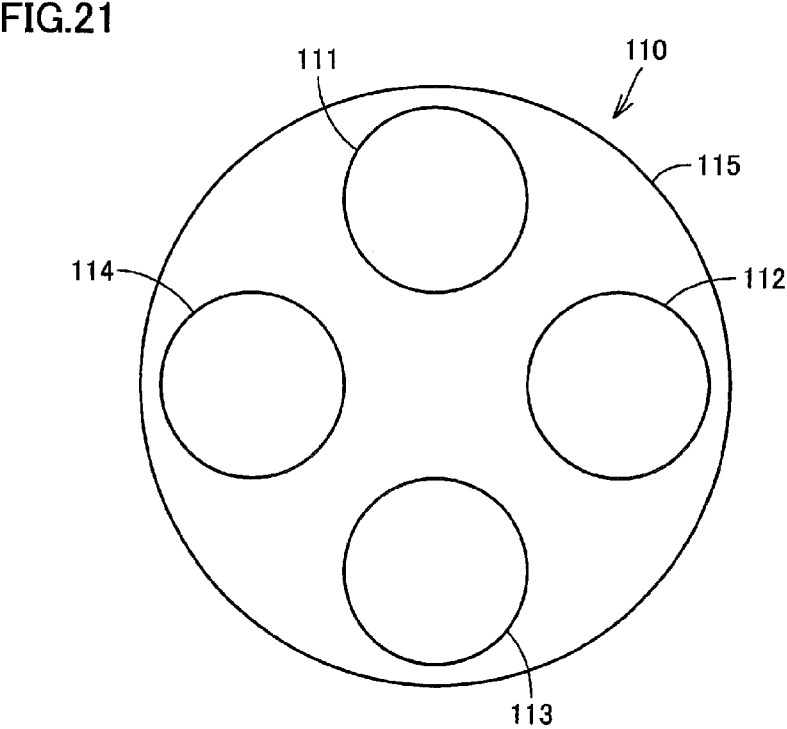
FIG. 21 is a plan view showing an exemplary variation of secondary resonant coil 110.

Note that while the FIGS. 1-20 examples provide secondary resonant coil 110 formed of a single conducting wire, larger-diameter coil 115, and smaller-diameter coil 111, smaller-diameter coil 112, smaller-diameter coil 113 and smaller-diameter coil 114 may each be formed of a separate conducting wire, as shown in FIG. 21.

Furthermore, while four smaller-diameter coils 111, 112, 113, 114 are provided by way of example, they are not limited to four in number.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

Industrial Applicability

The present invention is applicable to coil units, contactless power transfer apparatuses, vehicles, and contactless power feeding systems.

Reference Signs List

100: vehicle; 101, 201: coil unit; 110: secondary resonant coil; 111, 112, 113, 114, 241, 242, 243, 244: smaller-diameter coil; 115, 245: larger-diameter coil; 115a, 115b, 115c, 115d, 245a, 245b: arcuate portion; 116, 117, 118, 119, 246: crossover; 120, 350: secondary electromagnetic induction coil; 121, 122, 123, 124, 231: bent portion; 130: rectifier; 140: converter; 150: power storage device; 170: motor; 200: power feeding device; 210: AC power supply; 220: high frequency power driver; 230, 320: primary electromagnetic induction coil; 240, 330: primary resonant coil; 310: high frequency power supply; 340: secondary resonant coil; 360: load; D0, D1, D2, D3, D4, D10, D11, D12, D13, D14: direction of current; L: distance; NF1, NF2: near field; O1, O2, O3: centerline; UNF0, UNF1, UNF2, UNF3, UNF4, UNF10, UNF11: unit near field.

The invention claimed is:

1. A coil unit comprising a second self-resonant coil electromagnetically resonating with a spaced, first self-resonant coil to perform at least one of transmitting power to said first self-resonant coil and receiving power from said first self-resonant coil,
   said second self-resonant coil including a first coil and a plurality of second coils provided inside said first coil,
   a direction of a magnetic field formed by said first coil being the same as a direction of magnetic fields formed by said second coils.

2. The coil unit according to claim 1, wherein said second coils are mutually spaced.

3. The coil unit according to claim 1, wherein said first coil and said second coils are provided as a single-turn coil.

4. The coil unit according to claim 1, wherein said second self-resonant coil is formed of a single conducting wire.

5. The coil unit according to claim 1, wherein said second coils are inscribed in an inner circumferential portion of said first coil.

6. The coil unit according to claim 1, said second self-resonant coil being formed annularly with a centerline serving as a center, the coil unit further comprising an electromagnetic induction coil spaced from said second self-resonant coil along said centerline, wherein:
   said second self-resonant coil includes a crossover that connects said first coil and said second coil together;
   said crossover is bent to project toward said electromagnetic induction coil and thus cross over a portion of said second self-resonant coil; and
   said electromagnetic induction coil includes a bent portion bent along said crossover to have a fixed distance to said second self-resonant coil.

7. The coil unit according to claim 1, said second self-resonant coil being formed annularly with a centerline serving as a center, the coil unit further comprising an electromagnetic induction coil spaced from said second self-resonant coil along said centerline, wherein:
   said second self-resonant coil includes a crossover that connects said first coil and said second coil together; and
   said crossover is bent to project in a direction opposite to said electromagnetic induction coil and thus cross over a portion of said second self-resonant coil.

8. The coil unit according to claim 1, said second self-resonant coil being formed annularly with a centerline serving as a center, the coil unit further comprising an electromagnetic induction coil spaced from said second self-resonant coil along said centerline, wherein when said second self-resonant coil and said electromagnetic induction coil are seen along said centerline, said electromagnetic induction coil and said first coil overlap each other.

9. A contactless power transfer apparatus comprising a coil unit according to claim 1.

10. A vehicle comprising:
   a coil unit according to claim 1; and
   a power storage device to store power.

11. A contactless power feeding system comprising:
   a first coil unit including a first self-resonant coil; and
   a second coil unit including a second self-resonant coil electromagnetically resonating with said first self-resonant coil to perform at least one of transmitting power and receiving power,
   said first self-resonant coil including a first coil and a plurality of second coils provided inside said first coil,
   said second self-resonant coil including a third coil and a plurality of fourth coils provided inside said third coil,
   a direction of a magnetic field formed by said first coil being the same as a direction of magnetic fields formed by said second coils
   a direction of a magnetic field formed by said third coil being the same as a direction of magnetic fields formed by said fourth coils.

* * * * *